(12) United States Patent
Jiang et al.

(10) Patent No.: US 10,003,794 B2
(45) Date of Patent: *Jun. 19, 2018

(54) TERMINABLE SPATIAL TREE-BASED POSITION CODING AND DECODING

(71) Applicant: THOMSON LICENSING, Issy de Moulineaux (FR)

(72) Inventors: Wenfei Jiang, Beijing (CN); Kangying Cai, Beijing (CN); Yi Hu, Beijing (CN)

(73) Assignee: TLDTV, Issy-les-Moulineaux (FR)

( * ) Notice: Subject to any disclaimer, the term of this patent is extended or adjusted under 35 U.S.C. 154(b) by 962 days.

This patent is subject to a terminal disclaimer.

(21) Appl. No.: 14/360,262

(22) PCT Filed: Nov. 22, 2012

(86) PCT No.: PCT/CN2012/085081
§ 371 (c)(1),
(2) Date: May 22, 2014

(87) PCT Pub. No.: WO2013/078958
PCT Pub. Date: Jun. 6, 2013

(65) Prior Publication Data
US 2014/0307770 A1    Oct. 16, 2014

(30) Foreign Application Priority Data

Nov. 28, 2011 (WO) ................ PCT/CN2011/083035

(51) Int. Cl.
*G06T 17/00* (2006.01)
*G06T 15/00* (2011.01)
(Continued)

(52) U.S. Cl.
CPC ....... *H04N 19/00951* (2013.01); *G06T 9/005* (2013.01); *G06T 17/005* (2013.01); *H04N 13/0048* (2013.01)

(58) Field of Classification Search
USPC ......................................................... 375/240
See application file for complete search history.

(56) References Cited

U.S. PATENT DOCUMENTS 6,868,420 B2 * 3/2005 Perry ................ G06F 17/30961
707/743
7,659,894 B2 * 2/2010 Keller ........................ G06T 1/60
345/426
(Continued)

FOREIGN PATENT DOCUMENTS

CN        1946180      4/2007
CN        101661631    3/2010
(Continued)

OTHER PUBLICATIONS

Devillers et al., "Geometric Compression for Interactive Transmission", IEEE Visualization Conference Proceedings, pp. 319-326, 2000.

(Continued)

*Primary Examiner* — Jorge L Ortiz-Criado
*Assistant Examiner* — Susan E Hodges
(74) *Attorney, Agent, or Firm* — Brian J. Dorini; Ronald J. Kolczynski

(57) ABSTRACT

The invention provides a method of terminable spatial tree-based position coding and decoding, and corresponding coding and decoding apparatus. The encoding method comprises: constructing a cell around the input spatial points; recursively dividing the cell into sub-cells at different layers; and assigning a symbol for each sub-cell indicating whether or not there is a spatial point within each sub-cell. The method further comprising: terminating further division of a sub-cell, if the sub-cell contains only one point and the (Continued)

distance between the center point of the sub-cell and the point contained in the sub-cell is smaller than the allowed maximal error.

16 Claims, 13 Drawing Sheets

(51) Int. Cl.
*G06T 9/40* (2006.01)
*G06F 17/30* (2006.01)
*H04N 19/96* (2014.01)
*H04N 19/91* (2014.01)
*H04N 13/00* (2018.01)
*G06T 9/00* (2006.01)

(56) References Cited

U.S. PATENT DOCUMENTS

| | | |
|---|---|---|
| 2006/0274065 A1 | 12/2006 | Buyanovskiy |
| 2008/0238919 A1 | 10/2008 | Pack |
| 2009/0202160 A1 | 8/2009 | Kim et al. |
| 2012/0038640 A1* | 2/2012 | Lee .................. G06T 17/20 345/420 |

FOREIGN PATENT DOCUMENTS

| | | |
|---|---|---|
| JP | 2007503060 | 2/2007 |
| JP | 2008098970 | 4/2008 |
| KR | 20090087766 | 8/2009 |
| WO | WO2010149492 | 12/2010 |
| WO | WO2011044713 | 4/2011 |

OTHER PUBLICATIONS

Peng et al., "Geometry-guided Progressive Lossless 3D Mesh Coding with Octree (OT) Decomposition", ACM Trans. on Graphics, vol. 24, #3, Jul. 2005.

Huang et al., "A Generic Scheme for Progressive Point Cloud Coding", IEEE Transactions on Visualization and Computer Graphics, vol. 14, No. 2, Mar./Apr. 2008, p. 440-453.

Cernea et al., "Efficient Error Control in 3D Mesh Coding", 2010 IEEE International Workshop on Multimedia Signal Processing (MMSP), 2010: pp. 292-297.

Peng et al., Progressive Geometry Encoder Using Octree-Based Space Partitioning, 2004 IEEE, International Conference on Multimedia and Expo (ICME), pp. 1-4.

Ruwen Schnabel et al: "Octree-based point cloud compression",Point-Based Graphics 2006 : Eurographics / IEEE VGTC Symposium Proccedings,Jul. 29, 2006,pp. 1-11.

Search Report dated Feb. 28, 2013.

Chang et al., "A Linear Quadtree Coding Scheme with Hierarchical Structure and Rotational Operator", Proceedings of SPIE, vol. 2605, p. 182-192.

\* cited by examiner

Traversal Order (a)

(b)

(c)

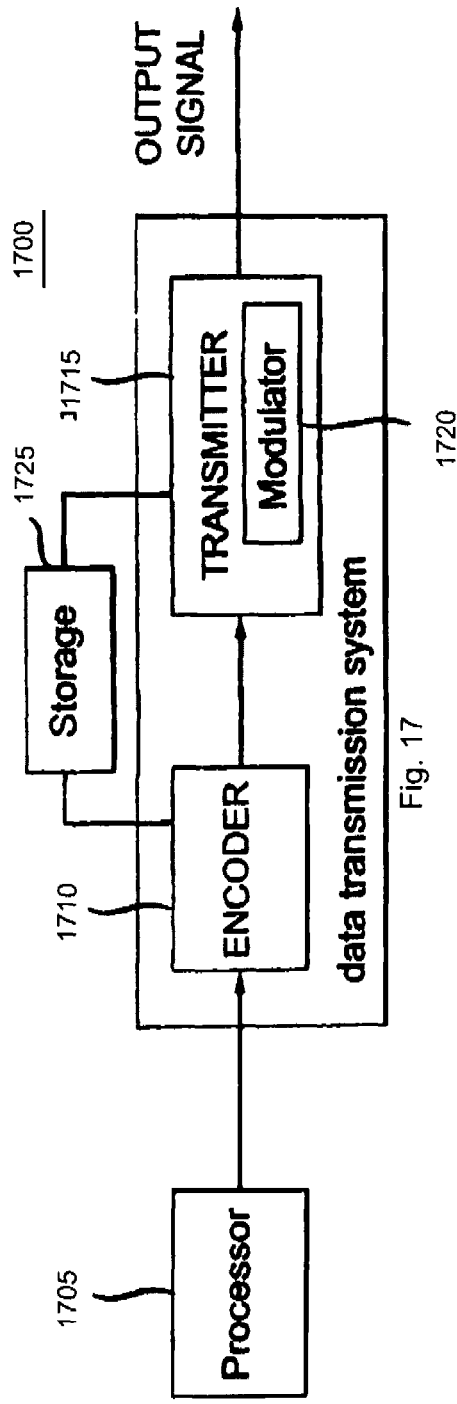
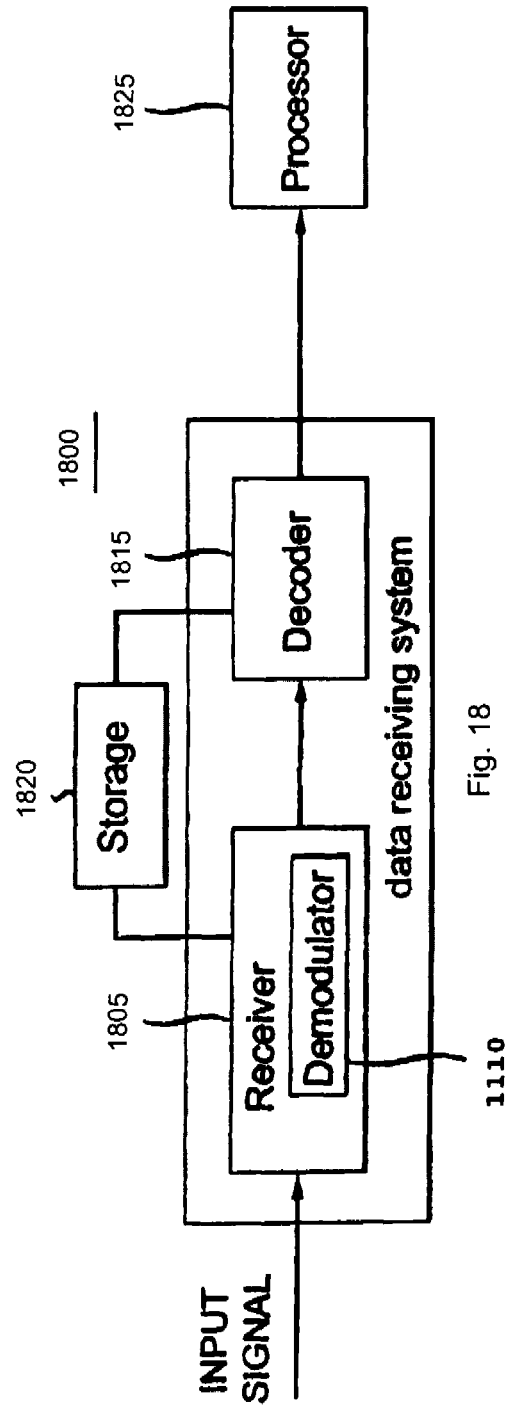

TERMINABLE SPATIAL TREE-BASED POSITION CODING AND DECODING

This application claims the benefit, under 35 U.S.C § 365 of International Application PCT/CN2012/085081, filed Nov. 22, 2012, which was published in accordance with PCT Article 21(2) on Jun. 6, 2013 in English and which claims the benefit of WO patent application No. PCT/CN2011/083035, filed Nov. 28, 2011.

TECHNICAL FIELD

The present invention generally relates to three dimensional (3D) models. In particular, the present invention relates to a method of terminable spatial tree-based position coding and decoding, and corresponding coding and decoding apparatus.

BACKGROUND

A sequence of symbols, wherein the symbols are chosen from an alphabet or a symbol set, can be compressed by entropy coding. An entropy coding engine assigns codewords for symbols based on the statistical model, i.e., the probability distributions of symbols. In general, more frequently used symbols are entropy coded with fewer bits and less frequently occurring symbols are entropy coded with more bits.

Entropy coding has been studied for decades. Basically, there are three types of entropy coding methods: variable length coding (VLC), like Huffman coding, arithmetic coding, and dictionary-based compression, like Lempel-Ziv (LZ) compression or Lempel-Ziv-Welch (LZW) compression.

The VLC codes use integer number of bits to represent each symbol. Huffman coding is the most widely used VLC method. It assigns fewer bits to a symbol with greater probability, while assigning more bits to a symbol with a smaller probability. Huffman coding is optimal when the probability of each symbol is an integer power of ½. Arithmetic coding can allocate a fractional number of bits to each symbol so that it can approach the entropy more closely. Huffman coding and arithmetic coding have been widely used in existing image/video compression standards, e.g., JPEG, MPEG-2, H.264/AVC. The LZ or LZW utilizes a table based compression model where table entries are substituted for repeated strings of data. For most LZ methods, the table is generated dynamically from earlier input data. The dictionary based algorithm has been employed in, for example, GIF, Zip, PNG standards.

Spatial tree based approaches can be used to compress geometry data, such as random point positions and vertex positions of watertight 3D models. They organize input spatial points by an octree or a k-d tree. The tree is traversed and the information required for tree restoration is stored.

Initially, a bounding box is constructed around all points of a 3D model. The bounding box of all 3D points is regarded as a single cell in the beginning. To build the spatial tree, a cell is recursively subdivided until each non-empty cell is small enough to contain only one vertex and enable a sufficiently precise reconstruction of the vertex position. As vertex positions can be restored from central coordinates of corresponding cells, the spatial tree based algorithms may achieve multi-resolution compression with the same compression ratio as single-resolution compression algorithms.

In a k-d tree based approach, a cell is subdivided into two child cells and the number of vertices in one of the two child cells is encoded in each iteration, as shown in FIG. 1. If a parent cell contains p vertices, the number of vertices in one of the child cells can be encoded using log 2(p+1) bits with an arithmetic coder.

On the other hand, an octree based approach subdivides, in each iteration, a non-empty cell into eight child cells. For ease of illustration, 2D examples describing a quadtree are shown in FIGS. 2 and 3. The traversal orders are denoted by arrows. For encoding, a current parent cell is split into four child cells that are traversed in a pre-defined order, and a single bit per child cell indicates whether or not there is a point within the child cell. For example, in FIG. 2, the child cells of two parent cells 1 and 2 are traversed as shown in arrows, with non-empty child cells being colored gray. Child cells 210, 211, 212, and 213 of the first parent cell 1 are represented by a first sequence '1010'. Since the first and third child cells 210, 212 of the traversal are non-empty (i.e., contain one or more points), they are indicated by '2's. The second and fourth child cells 211, 213 are empty (i.e. contain no points), they are indicated by '0's. FIG. 3 shows the same cells using different traversals and resulting sequences.

FIG. 4 shows parent and child cells of an octree scheme. In the octree scheme, a parent cell is split into eight child cells 40, . . . , 46 (one hidden child cell behind lower left cell 42 is not shown). A possible traversal order could be left-right, up-down and front-back, resulting in a traversal sequence of cells 40-41-42-43-44-45-(hidden cell behind lower left cell 42)-46. Correspondingly, in the octree case the non-empty child cell configuration is denoted by 8-bit binaries, covering all the 255 possible combinations of empty and non-empty child cells. Separate encoding of the number of non-empty child cells is not required. TABLE 1 is an example of a sequence.

TABLE 1

| An exemplary sequence |
| --- |
| 11111111 |
| 01100110 |
| 00111011 |
| 11001100 |
| . . . |
| 00010000 |
| 00000010 |
| 00000010 |
| 10000000 |
| 00000001 |

Note that the specific traversal order of child cells within a parent cell is not very relevant for the present embodiments. In principle, any traversal order can be used for the present embodiments. In the following, the string of bits used to represent a child cell configuration is denoted as a symbol. In the example of TABLE 1, 8 bits are used for each symbol. In other implementations, the number of bits in a symbol may vary. For example, a 4-bit string is used to represent the child cell configuration for a quadtree, and thus, the number of bits for a symbol in the example of FIG. 2 is 4.

FIG. 5 shows an example of an octree structure. Each node is associated with a symbol and each layer corresponds to a certain precision of the tree representation. The initial cell is divided into eight cells. Child cells 1, 2, 5, 6, and 7 contain more vertices and child cells 3, 4, and 8 are empty, resulting an 8-bit symbol 11001110 (510) to represent the child cell configuration at layer 0. Each non-empty child cells are further divided and the corresponding child cell configurations are represented in layer 1. The subdivision may continue until each non-empty cell only contains one vertex.

The above approaches are proposed to represent vertex positions of watertight 3D models. The prediction methods may become invalid when representing random distributed points. Thus, it is preferable to employ the basic method of spatial tree to do position coding, in consideration of complexity and robustness. Take quadtree for example, the non-empty-sub-cell configuration is denoted by 4-bit binaries, covering all the 15 combinations. And the number of non-empty-child cells T is not needed any more consequently.

FIG. 6 is an exemplary diagram showing the principle of building a quadtree in prior art.

FIG. 6(*a*) is an exemplary diagram showing the traversal order of the quadtree construction. The traversal orders are denoted by arrows. For encoding, a current parent cell is split into four child cells that are traversed in a pre-defined order as shown in FIG. 6(*a*).

FIG. 6(*b*) is an exemplary diagram showing the hierarchical division of 2D space. As shown in FIG. 6(*b*), the small black squares denote the points to be coded. The plane is divided into 4 sub-cells with equal size. Since each sub-cell contains at least one points, the corresponding non-empty-sub-cell configuration is 1111. Further each sub-cell is divided into 4 sub-cells and the non-empty-sub-cell configuration is encoded. In FIG. 6(*b*), only the bottom-right child cell of the subcell "TL" in FIG. 2(*b*) contains a point. Thus, the corresponding non-empty-sub-cell configuration is 0010. The cells are iteratively subdivided and the non-empty-sub-cell configuration is encoded. The quadtree is constructed as FIG. 6(*c*), wherein each layer corresponds to one iteration of subdivision.

FIG. 7 is an exemplary diagram showing the flow chart of the process of building a quadtree in FIG. 6.

As shown in FIG. 7, the cell $C_{l,k}$ is subdivided, wherein $C_{l,k}$ denotes the kth cell at the l layer. A subdivision is terminated by the encoder when the following two conditions are met:

(a) every sub-cell at the deepest layer contains at most one point; and (b) the distance dist($v_{l,k}$, $c_{l,k}$) between the center point $c_{l,k}$ of the sub-cell and the point $v_{l,k}$ inside each sub-cell is smaller than the allowed maximal error th.

The allowed maximal error th can be set depending on the quality requirement of users.

As shown in FIG. 7, only when all the sub-cells in the layer l meet the above conditions (a) and (b), the process goes to subdivision of the next layer l+1.

The above mechanism shown in FIG. 7 works well on evenly-distributed points. However, if spatial points of a model are not evenly-distributed and some points are very close between each other, the above mechanism may have problems in coding efficiency. FIG. 8 is an exemplary diagram showing the case of unevenly-distributed points. As shown in FIG. 8, suppose the allowed maximal error of the point coordinates is 0.125, then two subdivisions are sufficient for most points except for the two points which are extremely close, represented by black squares. This is because the termination condition (a) described above cannot be satisfied for these two points. Thus, the subdivision for the other points has to be continued, result in a construction of a quadtree shown in FIG. 9. It could be appreciated that the actually nodes indicated by the broken block in FIG. 9 are useless. Therefore, the coding is inefficient for this case.

SUMMARY

According one aspect of the invention, a method for encoding input spatial points by a spatial tree structure is provided. The method comprises: constructing a cell around the input spatial points; recursively dividing the cell into sub-cells at different layers; and assigning a symbol for each sub-cell indicating whether or not there is a spatial point within each sub-cell. The method further comprising: terminating further division of a sub-cell, if the sub-cell contains only one point and the distance between the center point of the sub-cell and the point contained in the sub-cell is smaller than the allowed maximal error.

According one aspect of the invention, a method for decoding a bitstream of a spatial tree structure is provided. The method comprises: decoding mode information of the bitstream to determine a terminal coding mode is applied with the bitstream, recursively dividing a cell of the spatial tree structure into sub-cells at different layers. The method further comprises: terminate further division of a sub-cell if a termination code for the sub-cell is decoded or the division of the sub-cell reaches the maximal division layer.

According one aspect of the invention, an encoder for encoding input spatial points by a spatial tree structure is provided. The encoder receives data and generates an encoded signal. The encoder being adapted to perform the following operations: constructing a cell around the input spatial points; recursively dividing the cell into sub-cells at different layers; assigning a symbol for each sub-cell indicating whether or not there is a spatial point within each sub-cell, and terminating further division of a sub-cell, if the sub-cell contains only one point and the distance between the center point of the sub-cell and the point contained in the sub-cell is smaller than the allowed maximal error.

According one aspect of the invention, a decoder for decoding a bitstream of a spatial tree structure is provided. The decoder receives and encoded signal and generates spatial tree structure. The decoder is adapted to perform the following operations: decoding mode information of the bitstream to determine a terminal coding mode is applied with the bitstream, recursively dividing a cell of the spatial tree structure into sub-cells at different layers. The method further comprises: if the sub-cell contains only one point, terminate further division of a sub-cell if a termination code for the sub-cell is decoded or the division of the sub-cell reaches the maximal division layer.

It is to be understood that more aspects and advantages of the invention will be found in the following detailed description of the present invention.

BRIEF DESCRIPTION OF THE DRAWINGS

The accompanying drawings are included to provide further understanding of the embodiments of the invention together with the description which serves to explain the principle of the embodiments. The invention is not limited to the embodiments.

In the drawings:

FIG. 17 is a block diagram of an exemplary embodiment of a device including position coding in accordance with the principles of the present invention; and FIG. 18 is a block diagram of an exemplary embodiment of a device including position decoding in accordance with the principles of the present invention.

DETAILED DESCRIPTION

An embodiment of the present invention will now be described in detail in conjunction with the drawings. In the following description, some detailed descriptions of known functions and configurations may be omitted for conciseness.

In view of the problem in the conventional spatial tree based entropy coding described above, an embodiment of the present invention provides a terminable spatial based entropy coding. According to the embodiment of the invention, during a cell subdivision of a tree construction of an input symbol set, the subdivision of a sub-cell is terminated, regardless of other sub-cells in the same layer of the sub-cell, when the following two conditions are met:

(a) the sub-cell contains only one point; and (b) the distance between the center point of the sub-cell and the point contained in the sub-cell is smaller than the allowed maximal error.

According to the embodiment of the invention, a termination of subdivision is determined individually for each sub-cell in a layer during a cell subdivision of a tree construction of an input symbol set. According to the embodiment, a subdivision of a sub-cell can be timely terminated, without being influenced by other sub-cells in the same layer. Therefore, the coding efficiency can be improved in the case of unevenly-distributed spatial points contained in the input symbol set.

According to an embodiment of the invention, when it is determined that a subdivision of a sub-cell needs to be terminated, a terminal code is appended as the child of the node corresponding to the sub-cell in the constructed tree. It can be appreciated by a person skilled in the art that when a terminal code is appended to a node, the children of the node will not be encoded, which therefore will save the bit cost.

Next, a detailed description to the embodiment of the invention will be given.

Figure 10:
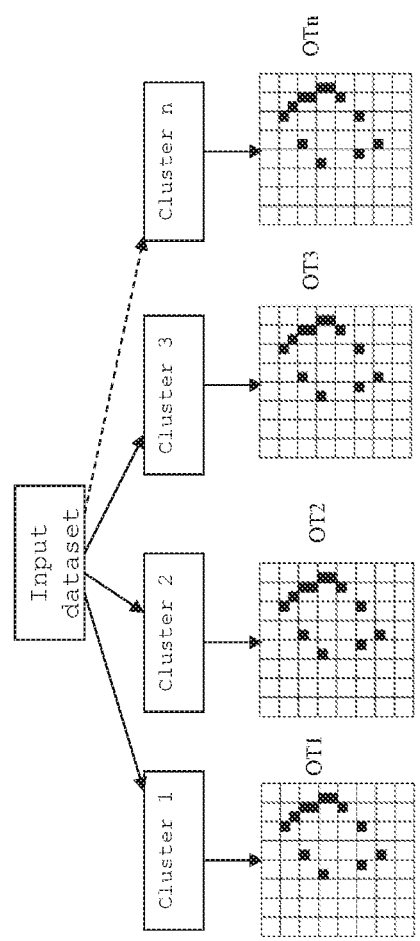
FIG. 10 is an exemplary diagram showing the clustering of an input symbol data set in a spatial tree construction process of the terminable spatial based entropy coding according to embodiment of the present invention.

FIG. 10 is an exemplary diagram showing the clustering of an input symbol set in a spatial tree construction process of the terminable spatial based entropy coding according to embodiment of the present invention.

As show in FIG. 10, points of an input symbol set are first clustered according to their spatial positions. Each cluster contains a set of points which are spatially aggregated. Then each cluster is compressed by organizing all the points belonging to it by one octree. A bounding box is constructed around all points of a cluster. The bounding box of is regarded as a single cell in the beginning. A cell is recursively subdivided to build the spatial tree. Detailed description in this respect is already provided above in the introduction to background technology and is omitted here.

Figure 11:
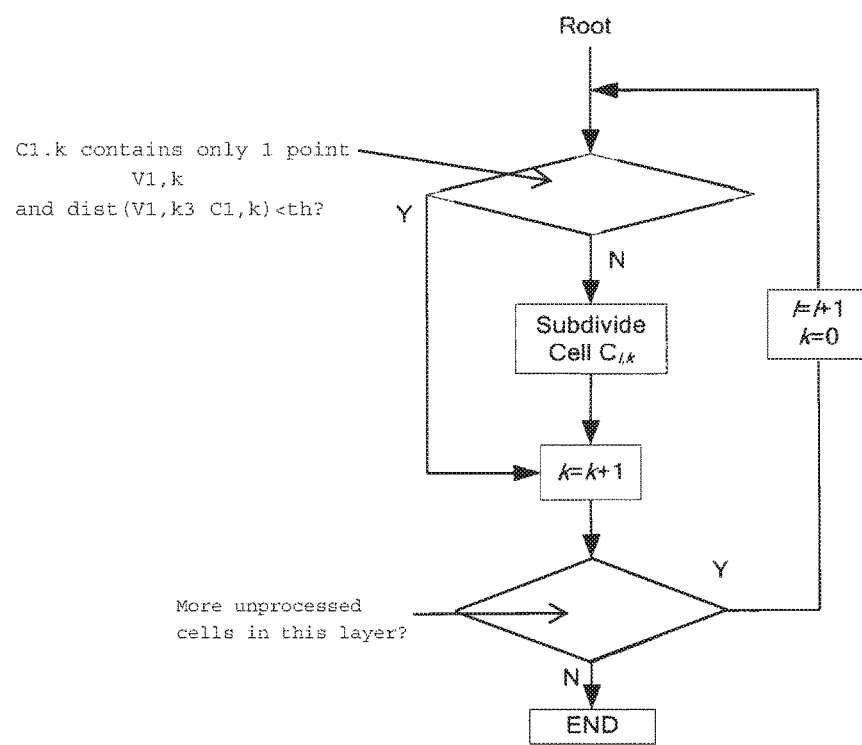
FIG. 11 is an exemplary diagram showing the flow chart of the terminable spatial tree based entropy coding according to an embodiment of the present invention.

FIG. 11 is an exemplary diagram showing the flow chart of the terminable spatial tree based entropy coding according to an embodiment of the present invention. As shown in FIG. 11, the cell $C_{l,k}$ is subdivided, wherein $C_{l,k}$ denotes the kth cell at the l layer. A subdivision for the kth cell at the layer l is terminated by the encoder when the following two conditions are met:

(a) the cell $C_{l,k}$ contains only one point; and (b) the distance between the center point $c_{l,k}$ of the cell $C_{l,k}$ and the point $v_{l,k}$ contained in the cell $C_{l,k}$ is smaller than the allowed maximal error th.

As shown in FIG. 11, the termination of subdivision of a cell in a layer is determined individually. That is, it is determined respectively for the cell $C_{l,k}$ and the cell $C_{l,k+1}$ whether the subdivision needs to be terminated, without influenced from each other.

Figure 1:
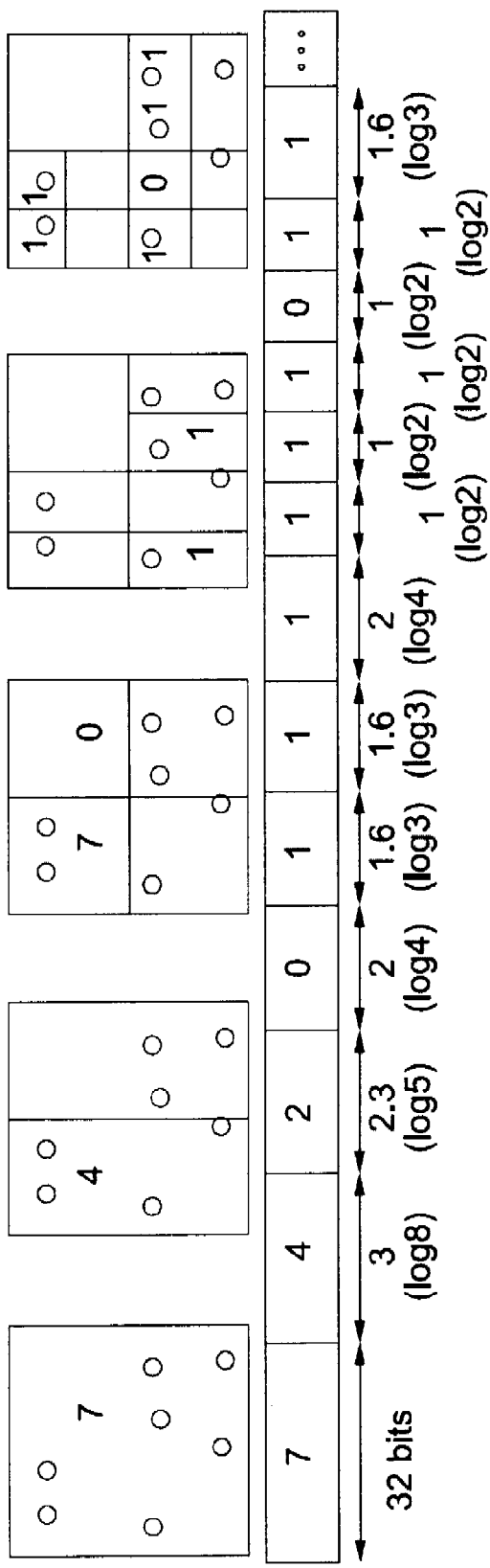
FIG. 1 is an exemplary diagram showing the principle of k-d tree based geometry coding in a 2D case.
Figure 2:
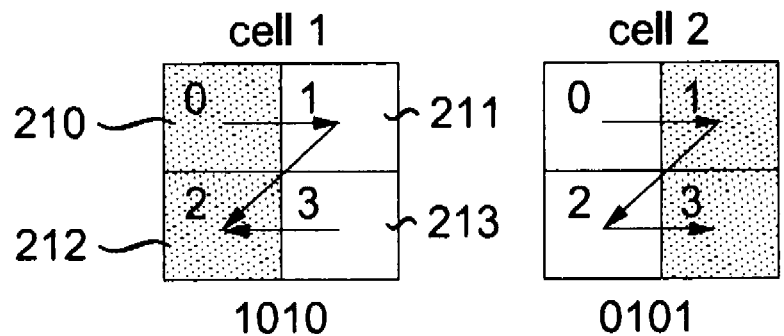
FIGS. 2 and 3 are exemplary diagrams showing the principle of quadtree based geometry coding in a 2D case.
Figure 3:
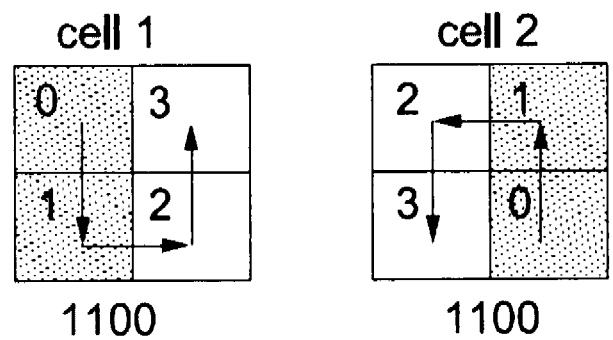
Figure 4:
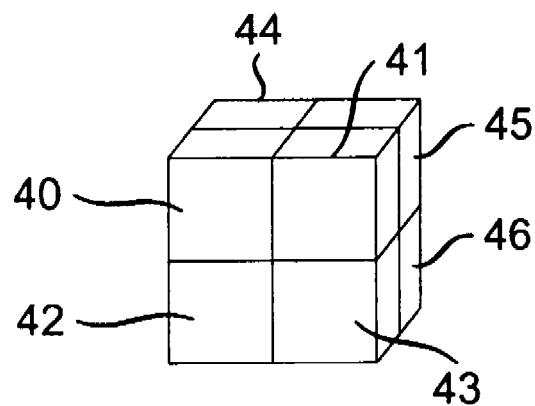
FIG. 4 is an exemplary diagram showing a cell partitioning.
Figure 5:
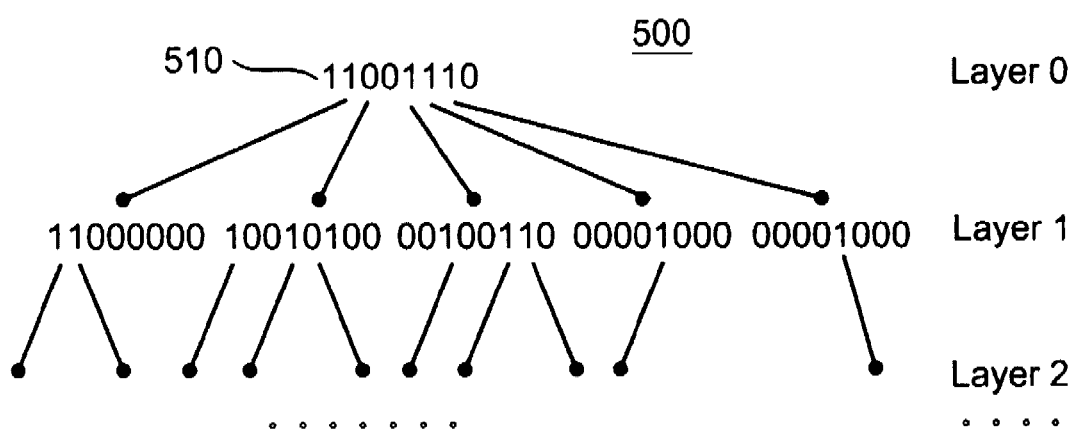
FIG. 5 is an exemplary diagram showing an exemplary octree.
Figure 6:
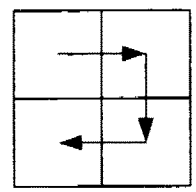
FIG. 6 is an exemplary diagram showing the principle of building a quadtree in prior art.
Figure 6:
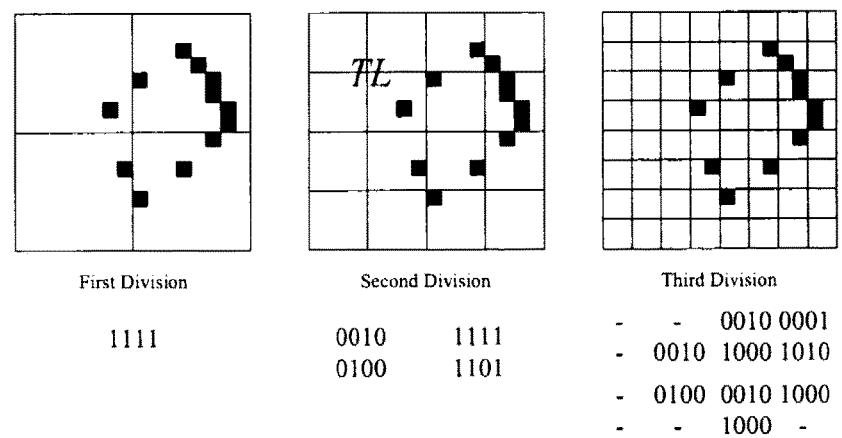
Figure 6:
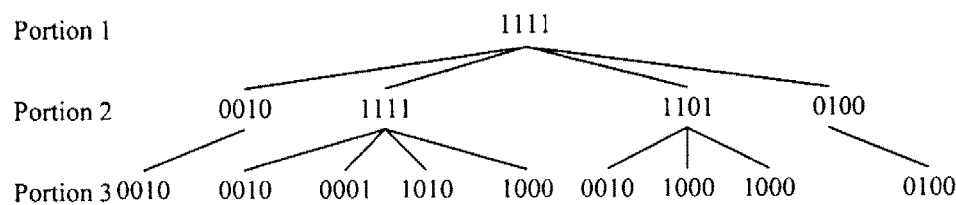
Figure 7:
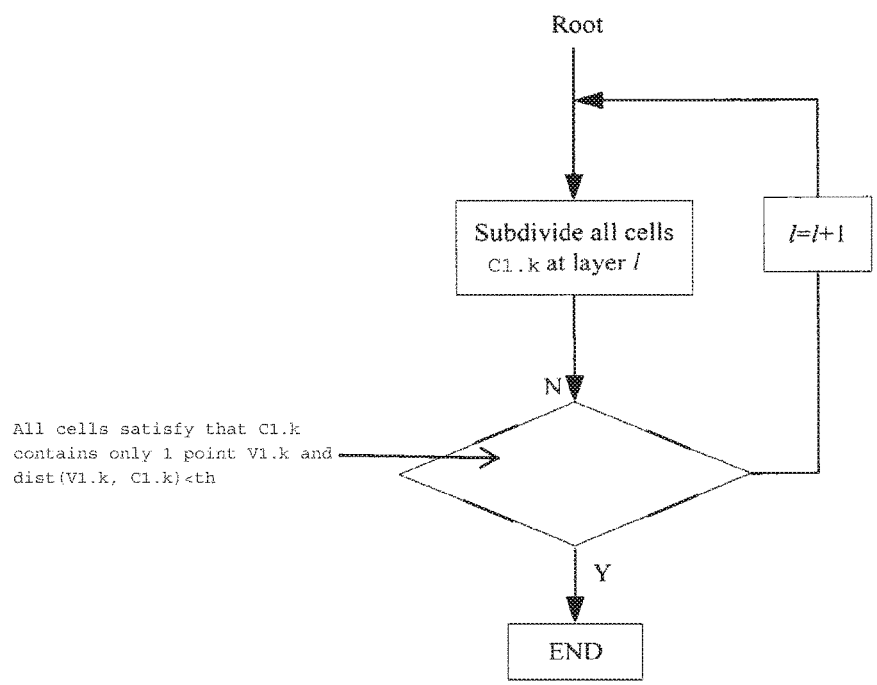
FIG. 7 is an exemplary diagram showing the flow chart of building a spatial tree in prior art.
Figure 8:
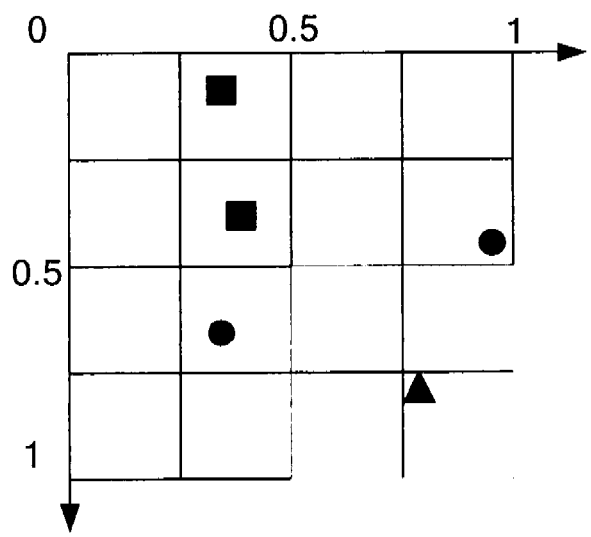
FIG. 8 is an exemplary diagram showing the case of unevenly-distributed points.
Figure 9:
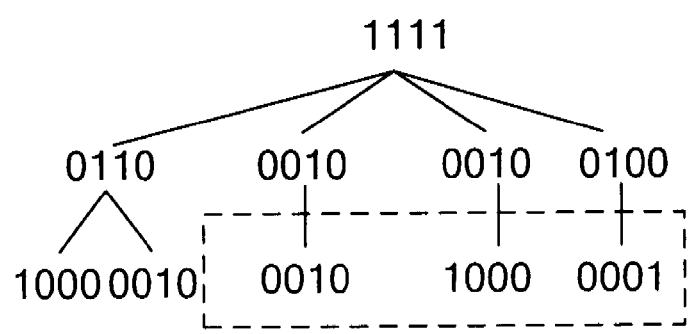
FIG. 9 is an exemplary diagram showing a quadtree constructed by the method in FIG. 7 for the case shown in FIG. 8.
Figure 12:
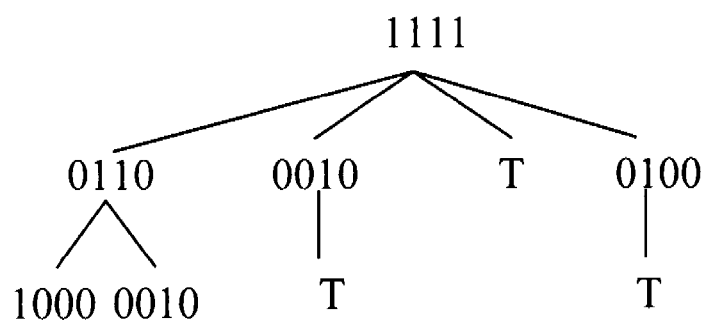
FIG. 12 is an exemplary diagram showing a quadtree constructed by the method in FIG. 11 for the case of unevenly-distributed point shown in FIG. 8.

Compared with the quadtree structure shown in FIG. 9 which is constructed by the conventional coding method as shown in FIG. 7, the quadtree structure in FIG. 12 which is constructed by the embodiment of the invention method of the embodiment of the invention does not have the unnecessary symbols in FIG. 8 anymore. As shown in FIG. 12, the "0010" at Layer 2 which is in the quadtree of FIG. 9 is replaced by the terminal code "T" because the point in the bottom-right cell in FIG. 8, represented by black triangle, is close enough to the central point of the upper-layer cell, which meets the condition of termination. Therefore, the sub-cell containing this point does not need to be further subdivided.

According to the embodiment of the invention described above, a termination of subdivision is determined individually for each sub-cell in a layer. When it is determined that the subdivision needs to be terminated, a terminal code can be appended as the child of the node corresponding to the sub-cell in the constructed tree. The above embodiment leads to one additional layer of terminal codes, which may limit the coding efficiency.

In order to further improve the coding efficiency, another embodiment of the invention is provided, wherein a terminal code is not appended for all terminations of subdivision. According to this embodiment, a maximal subdivision layer is determined, which could guarantee the required coding accuracy. During a cell subdivision of a tree construction approach, when a sub-cell contains only one point and the distance between the center point of the sub-cell and the point inside the sub-cell is smaller than the allowed maximal error, it is determined to terminate the subdivision but not to append a terminal code when the maximal subdivision layer is reached.

Figure 13:
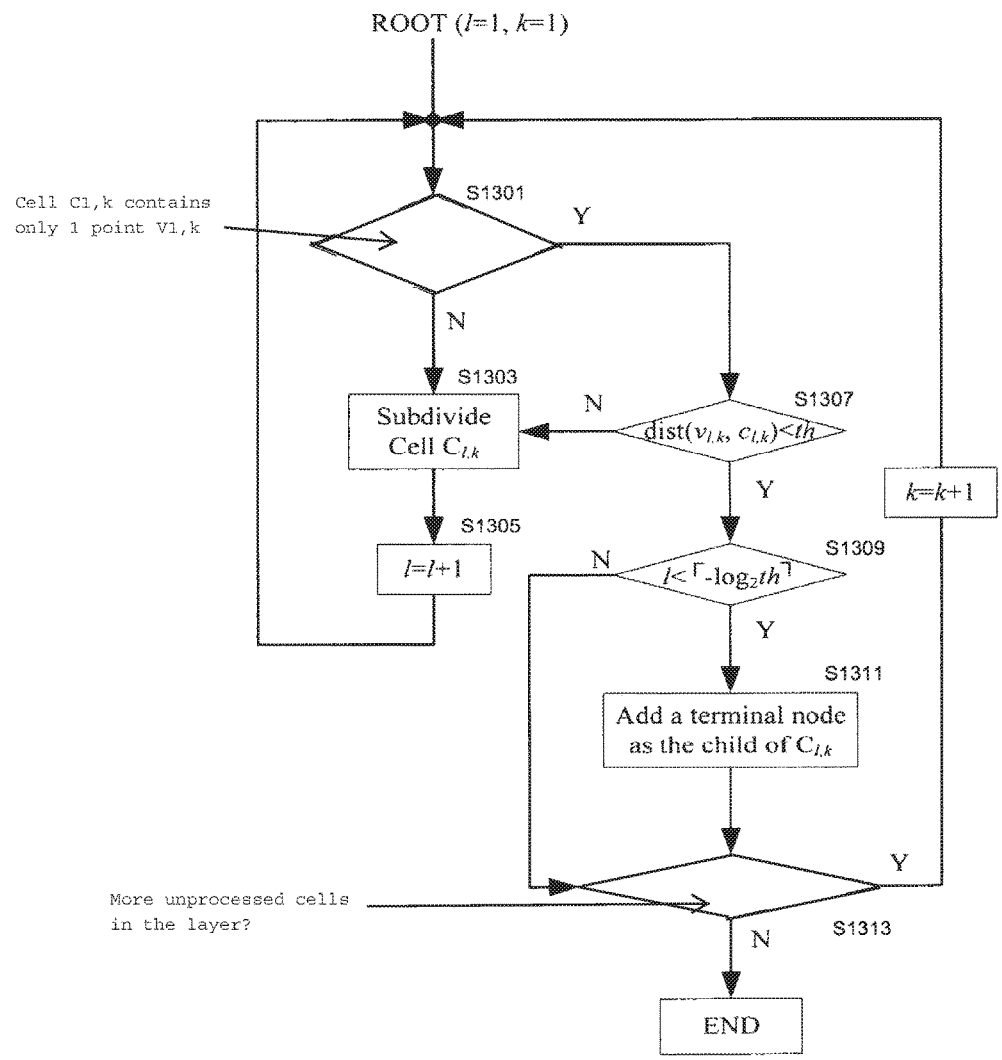
FIG. 13 is an exemplary diagram showing the flow chart of the terminable spatial tree based entropy coding according to an embodiment of the present invention.

FIG. 13 is an exemplary diagram showing the flow chart of the terminable spatial based entropy coding according to an embodiment of the present invention.

As shown in FIG. 13, at step S1301, it is determined for each octree whether a sub-cell only contains one point.

If the determination result of the step S1301 is "No", the method will proceed to step S1303 where the subdivision will continue. And at the next step S1305, the number of layers l of the subdivision will be incremented.

If the determination result of the step S1301 is "Yes", at the step S1307, the coordinate difference between the central point of the sub-cell and said point in this sub-cell will be determined and compared with the maximal error allowed.

If it is determined that the difference is larger than or equal to the allowed maximal error allowed at the step S1307, the process will go to step S1303 where the subdivision will continue.

If it is determined that the difference is smaller than the allowed maximal error at the step S1307, the process will go to step S1309 where it is determined whether the number of layer l reaches the maximal layer number which meet the precision requirement of the coding. In the embodiment of FIG. 13, the maximal layer number is set as a function of the allowed maximal error. That is, it is determined whether $l < -\log_2 th$, wherein th is the allowed maximal error.

If the determination result of the step S1309 is "Yes", at the step S1311, a terminal code is appended as the child of the node corresponding to the sub-cell. Then at the next step S1313, it is determined whether there are more unprocessed cells in this layer.

If the determination result of the step S1309 is "No", the subdivision will be determined but no terminal code is appended and the process will go to step S1313 to determine whether there are more unprocessed cells in this layer.

According to the embodiment of the invention, a subdivision of a sub-cell is terminated by appending a terminable code based on the coordinate difference between the central point of a sub-cell and an actual point inside when the sub-cell contains only one point. To save the overhead, the terminal code is not appended when the subdivision reaches the layer that guarantees the precision.

Figure 14:
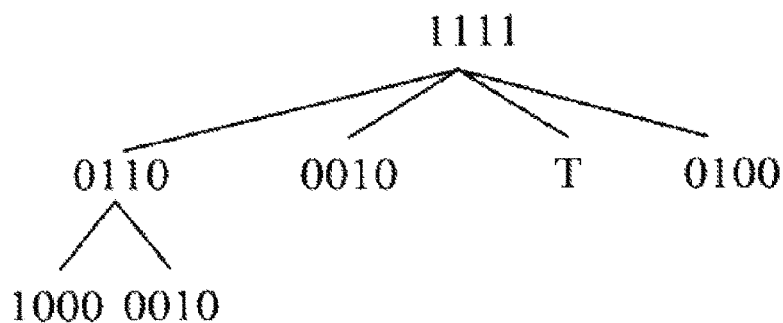
FIG. 14 is an exemplary diagram showing a quadtree constructed by the method in FIG. 13 for the case of unevenly-distributed point shown in FIG. 8.

FIG. 14 is an exemplary diagram showing a quadtree structure constructed for the case of unevenly-distributed points as shown in FIG. 8 with the spatial based entropy coding described in FIG. 13.

As shown in FIG. 14, it is unnecessary to append "T" child under the nodes "0010" and "0100" at Layer 2 since the precision have already met the requirement after 2 subdivisions.

There will be overhead to add the terminal symbol to the original symbols set, especially when the elements belonging to the alphabet are few, for example, when there are only 8 symbols in the alphabet for the bottom part of the octree. The method according to the embodiment of the invention could be a candidate mode, that is, a terminable mode, to be used jointly with the conventional approach. The efficiency of this mode could be evaluated during the tree construction, based on which a decision could be made on whether to enable the terminable mode.

Figure 15:
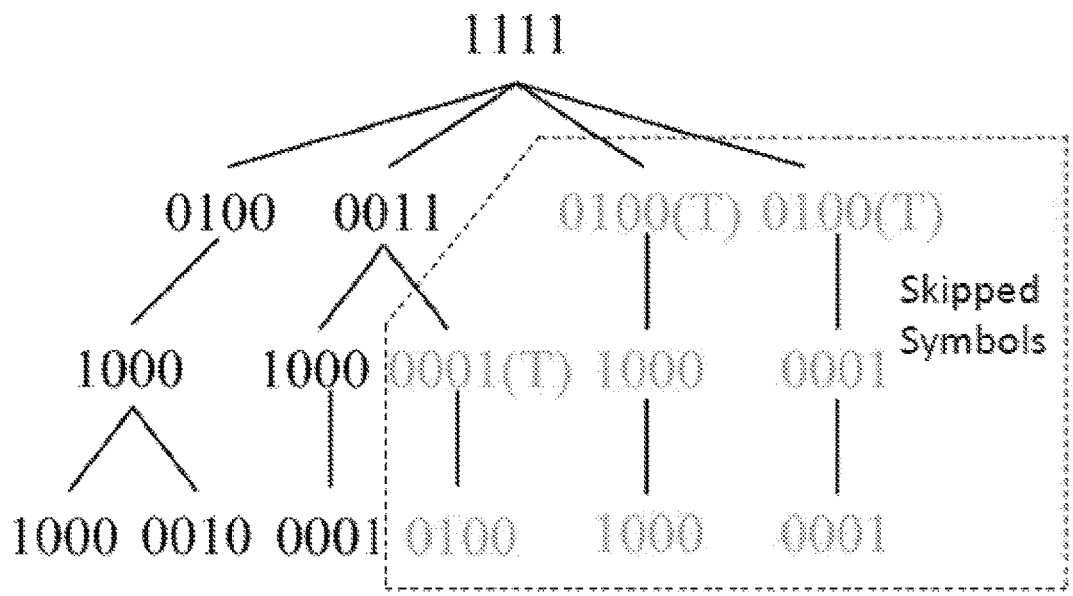
FIG. 15 is an exemplary diagram showing a completely constructed spatial tree, as a basis for analyzing whether to enable a termination coding mode.

FIG. 15 is an exemplary diagram showing a completely constructed spatial tree, as a basis for analyzing whether to enable a termination coding mode. It should be known by a codec where to append the terminal code. If a terminable mode is enabled, all the symbols within the broken block as shown in FIG. 15 can be skipped. However, the cost is that there is entropy increment of the ordinary symbols because of the inclusion of the terminal code. Get the statistics of the symbols from the layer (Layer R) where the percentage of the terminal code is larger than 10% to the deepest layer where terminal code may exist (Layer S) with terminable mode enabled and disabled respectively.

$$S=[-\log_2 th]-1$$

When terminable mode is disabled, suppose the total number of the symbols in this part is $m_0$ and the probability of the symbol i ($1 \le i \le n$, n is the size of original alphabet) is pi, then the entropy of a symbol for one node is calculated by $$H_0 = -\sum_i^{1 \sim n} p_i \log_2 p_i$$

The estimated bit cost is $c_0=m_0 H_0$.

When terminable mode is enabled, the total number of the symbols becomes m1 and the probability of the symbol i ($0 \le i \le n$, i=0 denotes the terminal code) is qi, then the entropy of a symbol for one node is calculated by $$H_1 = -\sum_i^{0 \sim n} q_i \log_2 q_i$$

The estimated bit cost is $c_1=m_1 H_1$.

If $c0>c1$, the terminable mode will be enabled. Otherwise, the terminable mode is disabled.

A 1-bit flag for the mode information can be written into the bitstream.

To decode the point positions, a spatial tree is reconstructed layer by layer. Firstly, the mode information is obtained by decoding a 1-bit flag. The initial probability model of the entropy decoder is determined according to the mode. When the top layer is completed, the decoder knows where to append the newly decoded symbols in the second layer. The layers are completed one after another until it reaches Layer (S+1) where the precision requirement must be met. If there are any nodes at Layer (S+1) having multiple "1"s, e.g., "0110", it must have children. The codec decodes necessary number of symbols to append as the children of such nodes. This process continues until all the leaf nodes have only one "1" or are the terminal code.

Figure 16:
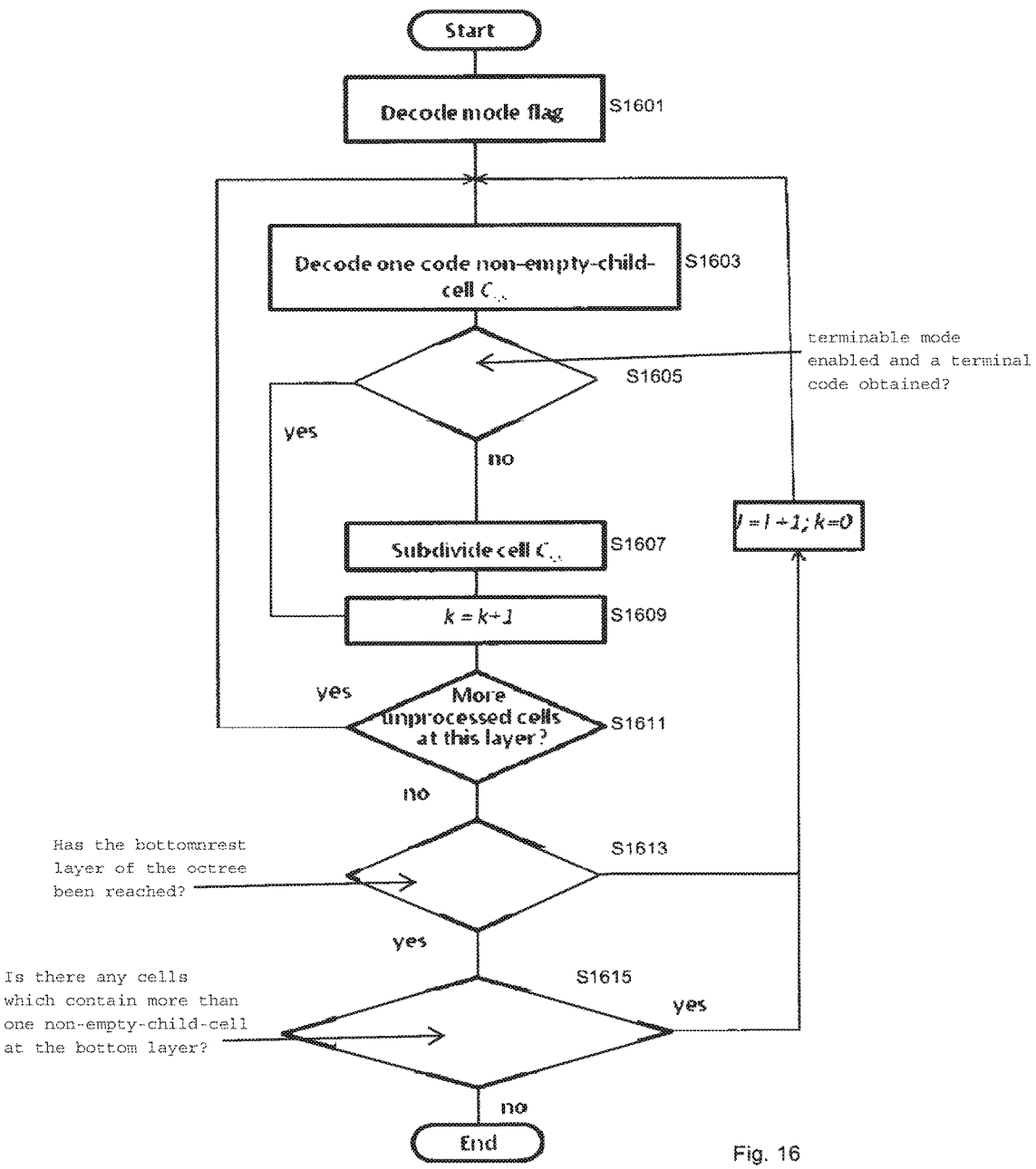
FIG. 16 is an exemplary diagram showing the flow chart of the terminable spatial tree based entropy decoding according to an embodiment of the present invention.

FIG. 16 is an exemplary diagram showing the flow chart of the terminable spatial tree based entropy decoding according to an embodiment of the present invention.

As shown in FIG. 16, at step S1601, a mode flag, for example the above-described 1-bit flag, is decoded to determine whether or not the terminal mode is enabled. If for example the mode flag "1" is 1, which denotes the terminal mode is enabled, is obtained, the process goes to step S1603 where one code of non-empty child cell $C_{l,k}$ is decoded.

At the next step S1605, it is determined whether a terminal code is obtained. If the determination result of the step S1605 is "No", at the step S1607, the cell $C_{l,k}$ is subdivided. If the determination result of the step S1605 is "Yes", the process goes to step S1609, where the subdivision for cell $C_{l,k}$ is skipped and start to process another cell $C_{l,k+1}$ in this layer.

At the next step S1611, it is determined whether there are more unprocessed cells at the layer? If the determination result of the step S16011 is "Yes", the process returns to step S1603. If the determination result of the step S16011 is "No", the process goes to step S1613 where it is determined whether the bottom-most layer of the spatial tree has been reached, which means the precision requirement could be guaranteed. If the determination result of the step S16013 is "No", it starts to process the cells in the next layer from the step S1603. If the determination result of the step S16013 is "Yes", the process goes to step S1615 where it is determined whether there is any cells which contain more than one non-empty sub-cell to be decoded. If the determination result of the step S16013 is "No", the decoding process stops. Otherwise, it starts to process the cells in the next layer from the step S1603.

FIG. 17 is a block diagram of an exemplary embodiment of a device including position coding in accordance with the principles of the present invention. Referring now to FIG. 17, a data transmission system or apparatus 1700 is shown, to which the features and principles described above may be applied. The data transmission system or apparatus 1700 may be, for example, a head-end or transmission system for transmitting a signal using any of a variety of media, such as, for example, satellite, cable, telephone-line, or terrestrial broadcast. The data transmission system or apparatus 1700 also, or alternatively, may be used, for example, to provide a signal for storage. The transmission may be provided over the Internet or some other network. The data transmission system or apparatus 1700 is capable of generating and delivering, for example, video content and other content such as, for example, 3D mesh models.

The data transmission system or apparatus 1700 receives processed data and other information from a processor 1705. In one implementation, the processor 1705 processes geometry data of 3D mesh models to generate sequences of symbols. The processor 1705 may also provide metadata to 1000 indicating, for example, how an octree tree data structure is divided into parts and other information.

The data transmission system or apparatus 1700 includes an encoder 1710 and a transmitter 1715 capable of transmitting the encoded signal. The encoder 1710 receives data information from the processor 1705. The encoder 1710 generates an encoded signal(s). The entropy encoding engine of encoder 1710 may be, for example, an arithmetic coder or Huffman coder.

The encoder 1710 may include sub-modules, including for example an assembly unit for receiving and assembling various pieces of information into a structured format for storage or transmission. The various pieces of information may include, for example, coded or uncoded video, and coded or uncoded elements such as, for example, substream length indicator, and syntax elements. In some implementations, the encoder 1710 includes the processor 1005 and therefore performs the operations of the processor 1705. Encoder 1710 operates in accordance with the principles described above with respect to FIGS. 11 and 13.

The transmitter 1715 receives the encoded signal(s) from the encoder 1710 and transmits the encoded signal(s) in one or more output signals. The transmitter 1715 may be, for example, adapted to transmit a program signal having one or more bitstreams representing encoded pictures and/or information related thereto. Typical transmitters perform functions such as, for example, one or more of providing error-correction coding, interleaving the data in the signal, randomizing the energy in the signal, and modulating the signal onto one or more carriers using a modulator 1720. The transmitter 1715 may include, or interface with, an antenna (not shown). Further, implementations of the transmitter 1015 may be limited to the modulator 1720.

The data transmission system or apparatus 1700 is also communicatively coupled to a storage unit 1725. In one implementation, the storage unit 1725 is coupled to the encoder 1710, and stores an encoded bitstream from the encoder 1710. In another implementation, the storage unit 1725 is coupled to the transmitter 1715, and stores a bitstream from the transmitter 1715. The bitstream from the transmitter 1015 may include, for example, one or more encoded bitstreams that have been further processed by the transmitter 1715. The storage unit 1725 is, in different implementations, one or more of a standard DVD, a Blu-Ray disc, a hard drive, or some other equivalent storage device.

FIG. 18 is a block diagram of an exemplary embodiment of a device including position decoding in accordance with the principles of the present invention. Referring now to FIG. 18, a data receiving system or apparatus 1800 is shown to which the features and principles described above may be applied. The data receiving system or apparatus 1800 may be configured to receive signals over a variety of media, such as, for example, storage device, satellite, cable, telephone-line, or terrestrial broadcast. The signals may be received over the Internet or some other network.

The data receiving system or apparatus 1800 may be, for example, a cell-phone, a computer, a set-top box, a television, or other device that receives encoded video and provides, for example, decoded video signal for display (display to a user, for example), for processing, or for storage. Data receiving apparatus 1800 may also be equipment in a theater that is receiving the signals for rendering for a theater audience. Thus, the data receiving system or apparatus 1800 may provide its output to, for example, a screen of a television, a computer monitor, a computer (for storage, processing, or display), or some other equivalent storage, processing, or display device.

The data receiving system or apparatus 1800 is capable of receiving and processing data information, where the data information may include, for example, 3D mesh models. The data receiving system or apparatus 1800 includes a receiver 1805 for receiving an encoded signal, such as, for example, the signals described in the implementations of this application. The receiver 1805 may receive, for example, a signal providing one or more of the 3D mesh models and/or texture images, or a signal output from the data transmission system 1700 of FIG. 17.

The receiver 1805 may be, for example, adapted to receive a program signal having a plurality of bitstreams representing encoded pictures. Typical receivers perform functions such as, for example, one or more of receiving a modulated and encoded data signal, demodulating the data signal from one or more carriers using a demodulator 1110, de-randomizing the energy in the signal, de-interleaving the data in the signal, and error-correction decoding the signal. The receiver 1105 may include, or interface with, an antenna (not shown). Implementations of the receiver 1105 may be limited to the demodulator 1810.

The data receiving system or apparatus 1800 includes a decoder 1815. The receiver 1805 provides a received signal to the decoder 1815. The signal provided to the decoder 1815 by the receiver 1805 may include one or more encoded bitstreams. The decoder 1815 outputs a decoded signal, such as, for example, decoded video signals including video information. Decoder 1815 operates in accordance with the principles described above with respect to FIG. 16.

The data receiving system or apparatus 1800 is also communicatively coupled to a storage unit 1820. In one implementation, the storage unit 1820 is coupled to the receiver 1805, and the receiver 1805 accesses a bitstream from the storage unit 1820. In another implementation, the storage unit 1820 is coupled to the decoder 1815, and the decoder 1815 accesses a bitstream from the storage unit 1820. The bitstream accessed from the storage unit 1820 includes, in different implementations, one or more encoded bitstreams. The storage unit 1820 is, in different implementations, one or more of a standard DVD, a Blu-Ray disc, a hard drive, or some other equivalent storage device.

The output data from the decoder 1815 is provided, in one implementation, to a processor 1825. The processor 1825 is, in one implementation, a processor configured for performing 3D mesh model reconstruction. In some implementations, the decoder 1815 includes the processor 1825 and therefore performs the operations of the processor 1825. In other implementations, the processor 1825 is part of a downstream device such as, for example, a set-top box or a television or other equipment (device, apparatus) at a movie theater.

One or more implementations are provided having particular features and aspects. In particular, several implementations relating to entropy encoding and decoding are provided. Predictive position entropy encoding and decoding may allow a variety of applications, such as, for example, compression of geometry data of a 3D mesh, random 2D coordinates, and any data source with varying statistics. However, variations of these implementations and additional applications are contemplated and within the present application, and features and aspects of described implementations may be adapted for other implementations.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method for encoding input spatial points by a spatial tree structure, comprising:

constructing a cell around the input spatial points;
recursively dividing the cell into sub-cells at different layers; and
assigning a symbol for each sub-cell indicating whether or not there is any spatial points within each sub-cell,
wherein the method further comprising:
terminating further division of the sub-cell, if the sub-cell contains only one spatial point and a distance between a center point of the sub-cell and the spatial point contained in the sub-cell is smaller than a given error tolerance;
encoding, into a bitstream, a position of said input spatial point according to said spatial tree structure comprising the sub-cells.

2. The method according to claim 1, wherein the given error tolerance is an allowed maximal error which is set depending on a quality requirement of users.

3. The method according to claim 1, further comprising determining whether to terminate the division of the sub-cell by appending a termination code as a child of a node corresponding to the sub-cell in the spatial tree structure as a function of a maximal number of division layers.

4. The method according to claim 3, wherein the division of the sub-cell is terminated by appending the termination code as the child of the node corresponding to the sub-cell in the spatial tree structure when the division does not reach the maximal number of division layers.

5. The method according to claim 3, wherein the division of the sub-cell is terminated without appending the termination code as the child of the node corresponding to the sub-cell in the spatial tree structure when the division reaches the maximal division layer.

6. The method according to claim 3, further comprising determination of whether to enable the method as a function of an estimation of entropy compared with the case not using the method.

7. A method for decoding a bitstream of a spatial tree structure, comprising:

decoding mode information of the bitstream to determine a terminal coding mode is applied with the bitstream,
recursively dividing a cell of the spatial tree structure into sub-cells at different layers;
wherein the method further comprising:
if the sub-cell contains only one spatial point, terminating further division of the sub-cell if a termination code for the sub-cell is decoded or the division of the sub-cell reaches a maximal number of division layers,
decoding position of spatial points according to said spatial tree structure comprising the sub-cells.

8. The method according to claim 7, wherein the mode information is a 1-bit flag at the beginning of the bitstream.

9. An encoder for encoding input spatial points by a spatial tree structure, said encoder receives data and generates an encoded signal, said encoder being adapted to perform the following operations:

constructing a cell around the input spatial points;
recursively dividing the cell into sub-cells at different layers; and
assigning a symbol for each sub-cell indicating whether or not there is a spatial point within each sub-cell, and
terminating further division of the sub-cell, if the sub-cell contains only one spatial point and a distance between a center point of the sub-cell and the spatial point contained in the sub-cell is smaller than a given error tolerance;

encoding, into a bitstream, a position of said input spatial paint according to said spatial tree structure comprising the sub-cells.

10. The encoder according to claim 9, wherein the given error tolerance is an allowed maximal error which is set depending on a quality requirement of users.

11. A decoder for decoding a bitstream of a spatial tree structure, said decoder receiving an encoded signal and generates spatial tree structure, said decoder being adapted to perform the following operations:

decoding mode information of the bitstream to determine a terminal coding mode is applied with the bitstream, recursively dividing a cell of the spatial tree structure into sub-cells at different wherein the method further comprising:

if the sub-cell contains only one spatial point, terminating further division of the sub-cell if a termination code for the sub-cell is decoded or the division of the sub-cell reaches a maximal number of division layers, decoding position of spatial points according to said spatial tree structure comprising the sub-cells.

12. The decoder according to claim 11, wherein the mode information is a 1-bit flag at the beginning of the bitstream.

13. The encoder according to claim 9, further adapted to perform determining whether to terminate the division of the sub-cell by appending a termination code as a child of a node corresponding to the sub-cell in the spatial tree structure as a function of a maximal number of division layers.

14. The encoder according to claim 13, wherein the division of the sub-cell is terminated by appending the termination code as the child of the node corresponding to the sub-cell in the spatial tree structure when the division does not reach the maximal number of division layers.

15. The encoder according to claim 13, wherein the division of the sub-cell is terminated without appending the termination code as the child of the node corresponding to the sub-cell in the spatial tree structure when the division reaches the maximal division layer.

16. The encoder according to claim 13, further adapted to perform determining whether to enable the method as a function of an estimation of entropy compared with the case not using the method.

* * * * *